United States Patent [19]
Torii et al.

[11] Patent Number: 5,093,552
[45] Date of Patent: Mar. 3, 1992

[54] METHOD OF PREVENTING MIS-EMISSION OF A LASER BEAM IN A LASER ROBOT

[75] Inventors: Nobutoshi Torii, Hachioji; Susumu Ito; Akihiro Terada, both of Oshino, all of Japan

[73] Assignee: Fanuc Ltd., Minamitsuru, Japan

[21] Appl. No.: 635,492

[22] PCT Filed: May 28, 1990

[86] PCT No.: PCT/JP90/00681
§ 371 Date: Jan. 2, 1991
§ 102(e) Date: Jan. 2, 1991

[87] PCT Pub. No.: WO90/15699
PCT Pub. Date: Dec. 27, 1990

[30] Foreign Application Priority Data
Jun. 14, 1989 [JP] Japan .................................. 1-149353

[51] Int. Cl.⁵ .............................................. B23K 26/02
[52] U.S. Cl. .......................... 219/121.83; 219/121.62; 219/121.79
[58] Field of Search ...................... 219/121.61, 121.62, 219/121.78, 121.79, 121.74, 121.75, 121.83

[56] References Cited
U.S. PATENT DOCUMENTS
4,028,524  6/1977  Moll et al. ..................... 219/121.6
4,575,610  3/1986  Gavin ............................. 219/121.6

*Primary Examiner*—C. L. Albritton
*Attorney, Agent, or Firm*—Staas & Halsey

[57] ABSTRACT

A laser-beam mis-emission preventing method capable of improving safety of a laser robot. Upon supply of power to the laser robot, a processor of a robot control unit (10) compares a predetermined value with an angle (δ) formed between a horizontal plane (XY plane) and an axis (8a) of a laser nozzle (8) and computed based on joint angles (W, U, r, β) (S1–S3). When the laser nozzle angle (δ) is less than the predetermined value, an interlock signal delivered to the laser oscillator (30) is set to turn off the power of the laser oscillator, thereby bringing the laser oscillator into a condition incapable of laser oscillation (S5). This prevents mis-emission of the laser beam which occurs due to deficiency of a robot operating program, erroneous manual operation, etc., and which can damage the human body or peripheral devices.

4 Claims, 2 Drawing Sheets

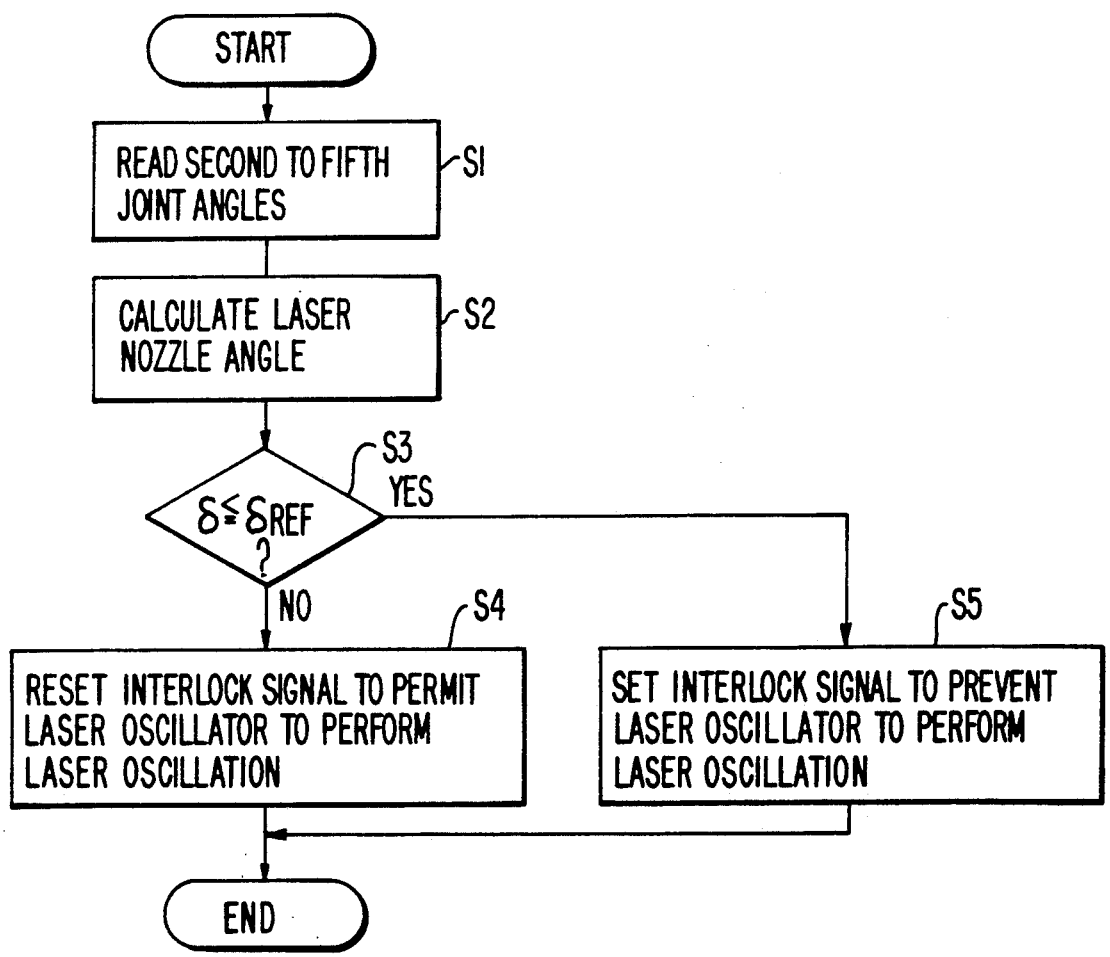

METHOD OF PREVENTING MIS-EMISSION OF A LASER BEAM IN A LASER ROBOT

TECHNICAL FIELD

The present invention relates to a robot for performing laser machining such as cutting and welding of a workpiece by emitting a laser beam thereon, and more particularly, to a method of preventing mis-emission of a laser beam, thereby improving safety of a laser robot of this kind.

BACKGROUND ART

An apparatus arranged to emit a laser beam onto a workpiece to practice various laser machining, e.g., cutting and welding of the workpiece, is conventionally known. If the laser beam to be emitted onto the workpiece is erroneously emitted from the laser machining apparatus to the human body or peripheral devices, there is a possibility of the human body, etc. being damaged. In a portal laser machining apparatus having a laser nozzle attached vertically downward and movable in the horizontal and vertical directions, a laser beam is emitted downward in the vertical direction from the laser nozzle, and hence, the laser beam is normally prevented from being erroneously emitted to the distance. Thus, according to the portal laser machining apparatus, normally, the danger due to the mis-emission of the laser beam does not occur. On the other hand, in the laser robot where a laser nozzle mounted to a distal end of a robot arm is permitted to assume various positions and orientations, the laser beam can be erroneously emitted to the distance. This is dangerous.

DISCLOSURE OF THE INVENTION

It is an object of the present invention to provide a method of preventing mis-emission of a laser beam, thereby improving safety of a laser robot.

In order to achieve the aforementioned object, according to the present invention, there is provided a method of preventing mis-emission of a laser beam, which method is applied to a laser robot having an arm provided at a distal end with a laser-beam emitting section. The method comprises the steps of (a) detecting an angle between a horizontal plane and an axis of the laser-beam emitting section on the basis of joint angles of respective joints of the laser robot, (b) comparing the detected angle with a predetermined angle, and (c) inhibiting emission of the laser beam from the laser-beam emitting section when the detected angle is less than the predetermined angle.

As described above, according to the present invention, since emission of the laser beam is inhibited when the angle between the horizontal plane and the axis of the laser-beam emitting section mounted to the arm of the laser robot is less than the predetermined angle, the laser beam never be erroneously inadvertently emitted to the distance, so that the human body and peripheral devices never be damaged, whereby the safety of the laser robot can be improved.

BRIEF DESCRIPTION OF THE DRAWINGS

FIG. 3 is a flowchart showing a laser-beam mis-emission preventing process executed by a processor of the robot control apparatus.

BEST MODE OF CARRYING OUT THE INVENTION

Figure 1:
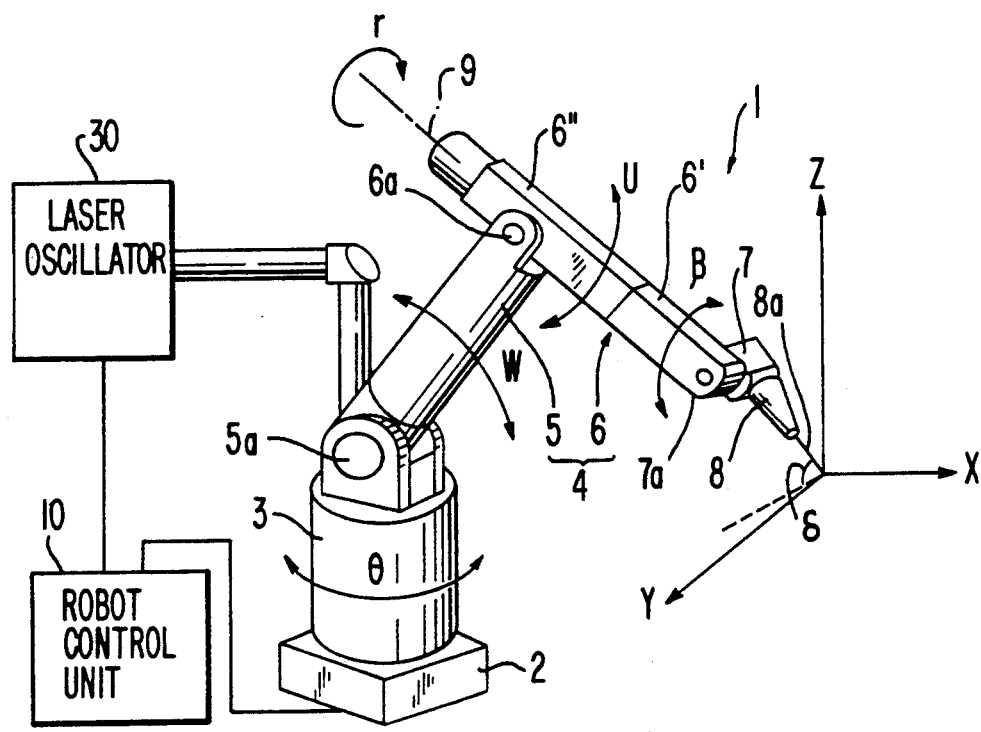
FIG. 1 is a schematic perspective view of a five-axis laser robot to which a method according to an embodiment of the present invention is applied, with the five-axis laser robot partly shown in block diagram.

Referring to FIG. 1, a fifth-axis laser robot, to which a laser-beam mis-emission preventing method of an embodiment of the present invention is applied, is provided with a robot body 1 which comprises a base 2 fixed to a floor, a body section 3 disposed on the base 2 for swiveling motion, and an arm 4 consisting of a first and second links 5 and 6. The second link 6 is mounted at its distal end with a laser-beam emitting section (a laser nozzle in the present embodiment) 8 through a support section 7. Further, the laser robot is provided with a robot control unit 10, and a laser oscillator 30 connected to the laser nozzle 8 for generating a laser beam, so as to drive the robot body 1 under the control of the control unit 10 to thereby control the position and orientation of the laser nozzle 8 in a robot installation space, and emit the laser beam, led to the laser nozzle 8 from the laser oscillator 30 through an optical cable (not shown) disposed along the arm 4, onto a workpiece (not shown) from the laser nozzle 8, thereby performing laser machining such as cutting of the workpiece.

More specifically, the body section 3 is coupled to the base 2 through a first joint (not shown) which is rotatable in unison with the body section, so that the body section 3 is swiveled relative to the base when the first joint is rotatively driven by a first servomotor (not shown). The first link 5, having a proximal end thereof coupled to an upper face of the body section 3 through a second joint 5a, is arranged to rotate in unison with the second joint 5a around the axis of the same joint for swing motion relative to the body section 3 when the second joint is rotatively driven by a second servomotor (not shown). The second link 6, having a proximal end thereof coupled to a distal end of the first link 5 through a third joint 6a, is arranged to rotate in unison with the same joint around the axis thereof when the third joint 6a is rotatively driven by a third servomotor (not shown), so that the second link 6 is swung relative to the first link 5. A distal end portion 6' of the second link 6, which portion is coupled through a fourth joint (not shown) to a distal end of a proximal end portion 6" of the second link 6, is arranged to rotate together with the fourth joint around the axis 9 thereof when the fourth joint is rotatively driven by a fourth servomotor (not shown). The laser nozzle 8, coupled to the nozzle support section 7 through a fifth joint 7a, is arranged to rotate around the axis of the same joint when the fifth join is rotatively driven by a fifth servomotor (not shown).

In FIG. 1, reference symbols $\theta$, W, U, r and $\beta$ and arrows associated therewith represent joint angles (hereinafter referred to as first to fifth joint angles) of the first to fifth joints and rotational directions, respectively. Further, reference symbol $\delta$ indicates an angle (hereinafter referred to as laser nozzle angle) between the axis 8a of the laser nozzle 8 and the horizontal plane (XY plane). The robot body 1 is provided with sensors (in the embodiment, first to fifth absolute encoders mounted to the first to fifth servomotors), not shown, for detecting the first to fifth joint angles θ, W, U, r and β, respectively.

Figure 2:
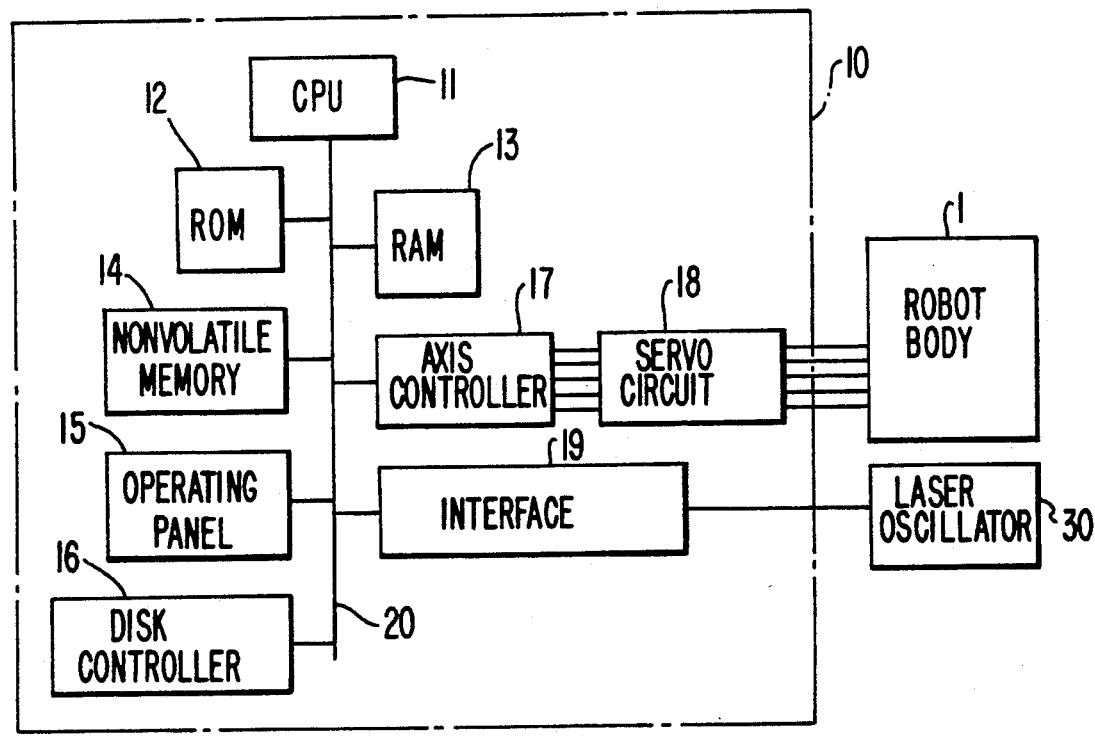
FIG. 2 is a schematic block diagram showing a principal part of a robot control apparatus illustrated in FIG. 1.

As shown in FIG. 2, the robot control unit 10 comprises a processor (hereinafter referred to as CPU) 11, a read-only-memory (ROM) 12 storing therein a control program executed by the CPU, a random-access-memory (RAM) 13 for temporarily storing various data and results of calculation by the CPU 11, and a nonvolatile memory 14 for storing a teaching program and a predetermined value δref of the laser nozzle angle δ for a laser-beam mis-emission preventing process mentioned later. The memory 14 is composed of a battery-backed up CMOS memory or a bubble memory. The control unit 10 further comprises an operating panel 15 for teaching operation and for input of various data, a disc controller 16 arranged to be mounted with a floppy disc (not shown) storing therein the teaching program or the like, an axis controller 17, a servo circuit 18 connected to the axis controller for controlling the drive of servomotors associated with individual axes of the robot body 1, and an interface 19. The teaching program stored in the floppy disc is permitted to be transferred to the nonvolatile memory 14 under the control of the disc controller 16 and the CPU 11. The aforementioned elements 12–17 and 19 are connected to the CPU 11 through buses 20. Further, the laser oscillator 30 and the absolute encoders for detecting the first to fifth joint angles are connected to the interface 19.

In the following, a laser-beam mis-emission preventing operation of the laser robot will be described.

First, the predetermined value δref of the laser nozzle angle δ is stored beforehand in a predetermined memory region of the nonvolatile memory 14 of the laser robot at shipping of the laser robot from a factory, for instance. The predetermined value δ ref is set to such a suitable value (for example, 45 degrees) that the human body and peripheral devices cannot be damaged by the laser beam so long as the laser nozzle angle δ is kept equal to or less than the predetermined value δ ref even if the laser beam is inadvertently emitted from the laser nozzle 8.

Upon turning on the power, the laser robot periodically executes the laser-beam mis-emission preventing process shown in FIG. 3. This process is carried out irrespective of an operation mode (drive stoppage mode, teaching mode, playback operation mode, or manual operation mode) of the robot, and is hence surely carried out so long as the power is turned on, even if the robot operation is kept stopped.

More specifically, in each of cycles of the mis-emission preventing process, the CPU 11 reads out stored values indicative of the current second to fifth joint angles W, U, r and β, from registers (not shown) corresponding to the second to fifth absolute encoders and accommodated in the CPU 11, respectively (step S1), and calculates the current laser nozzle angle δ from the joint angles W, U, r and β by means of coordinate-transformation processing (step S2). In the meantime, the laser nozzle angle δ does not depend upon the first joint angle θ.

Next, the CPU 11 compares the computed laser nozzle angle δ with the predetermined value δref, to determine whether or not the nozzle angle δ is equal to or less than the predetermined value δref (step S3). When it is determined that the nozzle angle δ is larger than the predetermined value δref and hence no injury is inflicted on the human body, etc. if the laser beam is emitted from the laser nozzle 8 which assumes its vertical position (Z-axis direction position) determined by the second and third joint angles W and U and its posture determined by the fourth and fifth joint angles r and β, the CPU 11 operates so as to permit emission of the laser beam. In the embodiment, the CPU 11 resets an interlock signal delivered from the CPU to the laser oscillator 30 through the interface 19 (step S4). At this time, the laser oscillator 30 is brought to a condition capable of laser oscillation, or the laser oscillating condition thereof is maintained if the laser oscillator 30 is already set in the oscillating condition. In the embodiment, when the interlock signal is reset, the power for the laser oscillator 30 is permitted to be turned on, or the power-on condition is maintained if such condition is already established.

On the other hand, if it is determined at step S3 that the nozzle angle δ is equal to or less than the predetermined value δref and hence there is a possibility of the human body or the like being damaged if the laser beam is emitted from the laser nozzle 8 which assumes its position and orientation determined by the second to fourth joint angles, the CPU 11 operates to inhibit the emission of the laser beam. In the embodiment, the CPU 11 sets the interlock signal (step S5). In response thereto, the laser oscillator 30 is brought to a condition incapable of laser oscillation. In the embodiment, the power of the laser oscillator 30 is turned off. As a result, when the laser nozzle 8 assumes those position and orientation at which the human body or the like can be damaged by the laser beam emitted from the nozzle, due to deficiency of the teaching program, erroneous manual operation by the operator, etc., the emission of the laser beam is automatically inhibited.

The present invention is not limited to the foregoing embodiment, but various modifications thereof may be made.

For example, although the single laser nozzle angle δref is fixedly set in the embodiment, the predetermined value δref may be varied in dependence on the vertical position of the laser nozzle in view of the fact that the horizontal distance between the laser nozzle 8 and a location to which the laser beam reaches varies depending upon the vertical position of the laser nozzle 8. In this case, predetermined values of the laser nozzle angle, each suited for a corresponding one of vertical positional regions of the laser nozzle, are stored in a look-up table, for instance. Then, the vertical position of the laser nozzle (generally, that of a tool center position) is computed between steps S2 and S3 in FIG. 3 by means of coordinate-transformation processing, and the predetermined value corresponding to the computed vertical position is read out from the look-up table.

In the embodiment, the power of the laser oscillator 30 is turned off, if desired. However, it is enough to cause the emission of the laser beam from the laser nozzle 8 to be substantially inhibited in an appropriate manner, instead of power disconnection.

We claim:

1. A method of preventing mis-emission of a laser beam in a laser robot having an arm which is mounted at its distal end with a laser-beam emitting section, comprising the step of:
    (a) detecting an angle between a horizontal plane and an axis of the laser-beam emitting section on the basis of joint angles of respective joints of the laser robot;
    (b) comparing the detected angle with a predetermined angle; and (c) inhibiting emission of the laser beam from the laser-beam emitting section when the detected angle is less than the predetermined angle.

2. A method of preventing mis-emission of a laser beam according to claim 1, wherein said method is applied to a laser robot which is provided with a laser oscillator connected to the laser-beam emitting section for generating the laser beam, and wherein said laser oscillator is brought into a condition incapable of laser oscillation when the detected angle is less than the predetermined angle.

3. A method of preventing mis-emission of a laser beam according to claim 1, wherein said predetermined angle varies depending upon a vertical position of the laser-beam emitting section.

4. A method of preventing mis-emission of a laser beam according to claim 1, wherein said steps (a), (b) and (c) are executed irrespective of an operation mode of the laser robot when electric power to the laser robot is turned on.

* * * * *